United States Patent
Azpitarte et al.

(10) Patent No.: US 10,911,946 B2
(45) Date of Patent: Feb. 2, 2021

(54) LOCAL UNIT FOR MONITORING THE MAINTENANCE OF AN ITEM OF EQUIPMENT AND METHOD FOR THE VALIDATION OF A TASK ON THE ITEM OF EQUIPMENT

(71) Applicant: GETRALINE, Versailles (FR)

(72) Inventors: Jean-Patrick Azpitarte, Le Chesnay (FR); Nicolas Violet, Massy (FR)

(73) Assignee: GETRALINE, Versailles (FR)

( * ) Notice: Subject to any disclaimer, the term of this patent is extended or adjusted under 35 U.S.C. 154(b) by 532 days.

(21) Appl. No.: 15/851,789

(22) Filed: Dec. 22, 2017

(65) Prior Publication Data
US 2018/0189714 A1   Jul. 5, 2018

(30) Foreign Application Priority Data
Jan. 4, 2017  (EP) .................................. 17150301

(51) Int. Cl.
*H04W 12/00*  (2009.01)
*H04L 9/30*  (2006.01)
(Continued)

(52) U.S. Cl.
CPC ......... *H04W 12/00503* (2019.01); *H04L 9/30* (2013.01); *H04L 9/302* (2013.01);
(Continued)

(58) Field of Classification Search
CPC . H04L 9/302; H04L 9/30; H04L 63/10; H04L 63/107; H04W 12/06;
(Continued)

(56) References Cited

U.S. PATENT DOCUMENTS 6,101,525 A * 8/2000 Hecker ............... G06F 12/0253
 711/E12.009
6,151,676 A * 11/2000 Cuccia ................. H04L 9/3013
 380/259

(Continued)

FOREIGN PATENT DOCUMENTS

DE   10 2013 204 535   10/2013
DE   20 2013 011509   2/2014
(Continued)

OTHER PUBLICATIONS

C. Zheng and M. Kezunovic, "Synchronized sampling uses for real-time monitoring and control," 41st North American Power Symposium, Starkville, MS, 2009, pp. 1-6. (Year: 2009).*
(Continued)

*Primary Examiner* — Kari L Schmidt
(74) *Attorney, Agent, or Firm* — Nixon & Vanderhye

(57) ABSTRACT

A local maintenance monitoring unit is intended to be installed near an item of equipment, in order to make it possible to validate a task that is carried out by a maintenance technician on the item of equipment. The local maintenance monitoring unit is provided with short-range display or communication unit in order to transmit a check-value and a timestamp to a portable communication terminal with which the technician is equipped. It is thus possible to guarantee that the technician assigned for the task is actually located at the site of the maintenance task.

20 Claims, 3 Drawing Sheets

(51) Int. Cl.
*H04W 12/08* (2009.01)
*H04W 12/06* (2009.01)
*H04L 29/06* (2006.01)
*G06Q 10/06* (2012.01)
*G06K 19/06* (2006.01)
*H04W 4/02* (2018.01)
*H04W 4/80* (2018.01)

(52) U.S. Cl.
CPC ............ *H04L 63/10* (2013.01); *H04L 63/107* (2013.01); *H04W 12/06* (2013.01); *H04W 12/08* (2013.01); *G06K 19/06037* (2013.01); *G06Q 10/063114* (2013.01); *G06Q 2220/00* (2013.01); *H04W 4/023* (2013.01); *H04W 4/80* (2018.02)

(58) Field of Classification Search
CPC ........... H04W 12/00503; H04W 12/08; H04W 4/023; H04W 4/80
See application file for complete search history.

(56) References Cited

U.S. PATENT DOCUMENTS

| | | | | |
|---|---|---|---|---|
| 8,694,352 | B1* | 4/2014 | Hawkins | G06Q 10/06 705/7.15 |
| 9,070,162 | B2* | 6/2015 | Cherry | G06Q 40/00 |
| 9,444,805 | B1* | 9/2016 | Saylor | H04L 63/107 |
| 10,597,254 | B2* | 3/2020 | Mahoney | B66B 5/0025 |
| 10,649,412 | B2* | 5/2020 | Nixon | G06F 3/04817 |
| 2002/0056043 | A1* | 5/2002 | Glass | H04L 63/0861 713/179 |
| 2004/0148131 | A1* | 7/2004 | Azpitarte | H04L 67/12 702/184 |
| 2005/0222933 | A1* | 10/2005 | Wesby | G06Q 40/06 705/36 R |
| 2006/0120345 | A1* | 6/2006 | Sung | H04L 65/1069 370/351 |
| 2006/0129815 | A1* | 6/2006 | Baldwin | H04L 9/0662 713/168 |
| 2007/0143398 | A1* | 6/2007 | Graham | G06Q 40/02 709/204 |
| 2007/0168488 | A1* | 7/2007 | Deguchi | G06Q 10/06 709/223 |
| 2010/0077451 | A1* | 3/2010 | Fujimoto | H04W 12/0609 726/3 |
| 2012/0208557 | A1* | 8/2012 | Carter | G01S 19/23 455/456.1 |
| 2013/0290154 | A1 | 10/2013 | Cherry et al. | |
| 2014/0006869 | A1* | 1/2014 | Rozmaryn | H04B 17/15 714/37 |
| 2015/0161495 | A1 | 6/2015 | Rodriguez et al. | |
| 2015/0206421 | A1* | 7/2015 | Moffa | G08B 25/14 340/514 |
| 2015/0237502 | A1* | 8/2015 | Schmidt | H04W 12/0023 726/7 |
| 2015/0295803 | A1* | 10/2015 | Jung | G06Q 10/20 709/224 |
| 2015/0302361 | A1 | 10/2015 | Liang et al. | |
| 2015/0381633 | A1* | 12/2015 | Grim | H04W 12/06 726/4 |
| 2016/0014112 | A1* | 1/2016 | Gunning | H04L 63/083 713/159 |
| 2016/0350166 | A1* | 12/2016 | Andrews | G06F 11/0751 |
| 2017/0093860 | A1* | 3/2017 | Hafernik | H04L 63/10 |
| 2018/0026840 | A1* | 1/2018 | Toepke | H04L 67/12 709/222 |
| 2018/0285832 | A1* | 10/2018 | Oz | G07C 5/006 |

FOREIGN PATENT DOCUMENTS

| | | | |
|---|---|---|---|
| FR | 2 845 223 | 4/2004 | |
| FR | 3 027 707 | 4/2016 | |
| JP | 2003-296781 | 10/2003 | |
| WO | WO-2004025575 A1 * | 3/2004 | ............ G04G 21/04 |
| WO | WO 2005/091230 | 9/2005 | |
| WO | WO-2008061146 A2 * | 5/2008 | ......... G06Q 10/1091 |

OTHER PUBLICATIONS

A. S. Maner, D. Devasthale, V. Sonar and R. Krishnamurti, "Mobile AR System using QR Code as Marker for EHV Substation Operation Management," 2018 20th National Power Systems Conference (NPSC), Tiruchirappalli, India, 2018, pp. 1-5. (Year: 2018).*

Polakis, Iasonas, et al. "The man who was there: validating check-ins in location-based services." Proceedings of the 29th Annual Computer Security Applications Conference. 2013, pp. 19-28. (Year: 2013).*

European Search Report, 17 15 0301.4; dated Jul. 6, 2017.

* cited by examiner

LOCAL UNIT FOR MONITORING THE MAINTENANCE OF AN ITEM OF EQUIPMENT AND METHOD FOR THE VALIDATION OF A TASK ON THE ITEM OF EQUIPMENT

BACKGROUND OF THE INVENTION

Field of the Invention

The present invention relates to a local unit for monitoring the maintenance of an item of equipment, as well as a method for the validation of a task that is carried out on this item of equipment.

Description of the Related Art

Many circumstances require a technician to carry out a task on an item of equipment installed at a specified site that is different from the place where a manager of the equipment is located, and may also be different from the workplace where the technician is based. The technician is then sent out on mission to the location of the item of equipment, at an agreed date, in order to carry out the planned maintenance task.

But under such circumstances, involving a task on assignment at a remote site, the problem arises of verifying that the on-site task has actually been performed on the agreed equipment and by the technician to whom the task was assigned. Such verification may be necessary in real time, while the task is being performed on the equipment, or subsequently, for example when a report on the task is being prepared.

Within the context of the present description, the terms equipment, technician and maintenance have the following meanings:

equipment: any installation or facility, interior or exterior, regardless of its function. In particular, this may be an item of equipment of individual or multiple housing units, an item of industrial equipment, an item of urban equipment, an item of transport equipment, an item of equipment with free or restricted access, a leisure facility, including a green space or municipal park, etc.;

technician: any agent assigned to perform a task on the equipment;

maintenance: any operation to be carried out on the equipment, regardless of the purpose of the operation, including repair, support, cleaning, upkeep of plant or of green space, monitoring, etc.

The invention can also be applied to verifying the task of an agent at the private home of a resident, provided that this home is equipped with a local unit according to the invention. The service provided by the agent, which is the subject of the home visit, may in this case be personal care, medical care, child care, housekeeping, a meal catering or delivery service, building work, etc.

However, an important field of application of the invention is the verification of a task carried out by a maintenance technician on an item of equipment that is installed in a multiple housing unit, such as an apartment building. For example, the equipment concerned can be an individual home heating boiler, an item of equipment for the production of domestic hot water, denoted DHW, or an item of equipment for controlled mechanical ventilation or CMV.

Furthermore, it is known, in particular from patent FR 2845223, to install a local monitoring unit near an item of equipment, such as a lift, in order to record data on an electronic maintenance record dedicated to this item of equipment. The electronic maintenance record contains information on the work that has been carried out during each maintenance task. But moreover, the local unit makes it possible to identify the technician responsible for each maintenance task on the item of equipment, and to record the start and finish times of each task. The identification of the technician who is present close to the item of equipment in order to carry out a maintenance operation is carried out by the technician himself. To this end, he enters an identification code, using a keyboard which the local unit can be equipped with, or by means of a system for reading hardware keys, chip cards or magnetic cards, or by means of a biometric recognition system.

SUMMARY OF THE INVENTION

Based on this situation, an object of the present invention consists of further improving the local unit, in order to ensure with greater reliability that a maintenance task planned for an item of equipment is being, or has been, carried out by the assigned technician.

A subsidiary object of the invention is to provide such increased reliability using means, in particular individual means for the maintenance technician, that are simple and inexpensive.

An additional object of the invention may also be to transmit, simply, reliably and inexpensively, to the user of the equipment, up-to-date information on the status of the equipment, latest results of measurements that have been carried out on the equipment or nearby, and an internet address making it possible to request a maintenance task.

In order to achieve these or other objects, a first aspect of the invention proposes a novel local maintenance monitoring unit that is intended to be installed near an item of equipment, in order to allow a task onto this item of equipment to be validated. This novel local unit is adapted for allowing capture, storage, transmission or supply of data relating to a task carried out by a maintenance technician assigned to the equipment. It comprises:

a processor;
a clock, internal to said local maintenance monitoring unit;
display or short-range communication means, controlled by the processor and adapted for making data content available to a portable communication terminal of the maintenance technician, this terminal being external to the local maintenance monitoring unit; and
data transmission means, also controlled by the processor and adapted for transmitting a value to an external server via a communication network external to the local maintenance monitoring unit.

According to the invention, it also comprises:
a random number generator, internal to the local maintenance monitoring unit, adapted for producing a fresh check-value randomly or pseudo-randomly upon each operation of the random number generator; and
a memory, arranged in order to store a value in combination with a timestamp obtained from the clock;

In addition, the processor of the local maintenance monitoring unit is adapted for controlling the execution of the following sequence of steps, called a renewal sequence:

/i/ controlling a fresh operation of the random number generator;
/ii/ controlling an update of the memory by writing thereto the fresh check-value that was produced by the fresh operation of the random number generator, in combination with a timestamp of the fresh operation of the random number generator;

/iii/ controlling the data transmission means to transmit the fresh check-value to the external server, together with an identifier of the local maintenance monitoring unit;

/iv/ encrypting the timestamp of the fresh operation of the random number generator;

/v/ including in the data content, the fresh check-value, the encrypted timestamp, the identifier of the local maintenance monitoring unit, and possibly additional data; then /vi/ controlling the display or short-range communication means to make the data content, as it results from step /v/, available to the terminal of the maintenance technician.

As a matter of principle, each check-value that is produced by the random number generator is independent of parameters of the equipment and measurement results that are optionally produced by sensors added to the local maintenance monitoring unit. Such a check-value, random or pseudo-random, is actually calculated by the generator by using an algorithm that is unknown to the technician and to a user of the equipment, such that each fresh check-value cannot be guessed or anticipated by the technician or the user. Thus, each fresh check-value appears random.

The data content received by the terminal of the maintenance technician from the display or short-range communication means of the local maintenance monitoring unit constitutes a copy of the check-value and the corresponding timestamp as they result from a latest execution of the renewal sequence. These two values can then be verified, in particular within the portable communication terminal of the maintenance technician, with respect to values that have been transmitted by another channel, in particular via the external server. In this way, the presence of the technician at the location of the equipment is confirmed by the check-value that he recovers on site from the local maintenance monitoring unit. This value must match the latest renewal produced by the random number generator of the local maintenance monitoring unit. Moreover, the encryption of the timestamp that is associated with the check-value, as this encrypted timestamp is transmitted to the terminal of the technician, prevents any attempt to falsify this timestamp for reasons of cheating or criminal intent. The local unit of the invention thus makes it possible to check, with a high level of reliability, that the task performed by the technician on the equipment complies with the terms of his assignment, in particular as regards the identity of the technician and the date of his task.

In preferred embodiments of the invention, the display or short-range communication means may comprise a matrix display. This latter is then controlled by the processor in step /vi/ to display a two-dimensional code that complies with the data content as it results from step /v/. In this way, an image of the two-dimensional code displayed, which is captured by the maintenance technician with his terminal, constitutes a copy of the two-dimensional code that is capable of restoring the data content. The check-value and the encrypted timestamp are therefore available in this way within the terminal of the maintenance technician for verification. In particular, but non-limitatively, the two-dimensional code may be of QR code, Data matrix or Flashcode type, or comply with any other method of encoding information in the form of a two-dimensional logo. These two-dimensional code formats achieve particularly high reliability on transmission of the data content by the display or short-range communication means. A part of this data content can then be displayed on a screen of the portable communication terminal of the maintenance technician, in a manner directly readable by him. Advantageously, the matrix display may be of E ink type, in order to reduce the power consumption of the local maintenance monitoring unit.

The operation of capturing an image of the two-dimensional code that is carried out by the technician, for example taking a photograph of the code, in combination with the renewed elements of the data content that are unknown to the technician, ensures that the technician is physically close to the equipment that is the subject of the maintenance task. In particular, a simple transmission of personal identification, equipment identification and timestamp data, which could be carried out remotely by an ill-intentioned technician without attending the site of the equipment, is no longer sufficient to fake verification of the task.

Within the framework of the present invention, by image capture is meant any type of detection of an item of two-dimensional information having a luminous intensity, in particular an instant image capture or "snapshot", corresponding to the usual photographic mode. But the image capture may also be carried out using other methods for detecting two-dimensional luminous intensity information, such as scanning by a row of detectors, usually called a scanner, for example a portable scanner.

Also, by matrix display is meant any display that is capable of displaying a two-dimensional pattern by producing variable luminous intensity values as pixels, which are distributed in rows and columns.

In other possible embodiments of the invention, the display or short-range communication means may comply with one of the following technologies: infra-red transmission, wired transmission, Bluetooth®, near-field communication (NFC), light fidelity (LiFi) and radio-frequency identification (RFID). The data content as it results from step /v/ is then made available, in step /vi/, to the terminal of the maintenance technician, by transmission from the local maintenance monitoring unit, using this technology.

Generally for the invention, the local maintenance monitoring unit may be adapted so that the execution of the renewal sequence, i.e. steps /i/ to /vi/, is triggered by one of the following events:

initialization or reinitialization of the local maintenance monitoring unit;

expiry of a validity period of the check-value stored in the memory, this validity period being determined by the processor from the check-value itself;

a command received by the local maintenance monitoring unit via the data transmission means, in particular from the external server, or via short-range communication means. Such a command may be subsequent to a negative result of a validation test of the task that is based on the check-value and timestamp as included in the data content, then received by the terminal of the maintenance technician through the display or short-range communication means; and completed execution of a validation test of the task based on the check-value and the timestamp, regardless of whether the result of this test is positive or negative; and geolocation of the portable communication terminal of the maintenance technician that reveals whether the terminal is moving away from or towards the local maintenance monitoring unit, by crossing a distance threshold.

Also generally for the invention, the processor may be adapted for also including in the data content, in step /v/ among the additional data, a uniform resource locator (url), also known as an internet or web address, either secured ("https:/") or unencrypted ("http:/"). This internet address may then appear in a legible fashion on the screen of a portable communication terminal of a user of the equipment who has retrieved the data content. It allows additional information on the equipment, or a maintenance task if this is necessary, to be quickly requested remotely.

Again, generally for the invention, the data transmission means that are adapted for transmitting the check-value to the external server via the external communication network can comply with one of the following protocols: Long-Range Wide Area Network (LoRaWAN), WiFi, Sigfox®, and mobile telephony protocols such as GSM, 2G, 3G, 4G and 5G.

In advantageous embodiments of the local unit of the invention, it may also comprise at least one of the following additional components:
  means of detecting movement of the local maintenance monitoring unit, and alarm means arranged in order to be activated when movement of the local maintenance monitoring unit is detected by the detection means;
  a power source, in particular a cell, a battery, a photovoltaic generator and/or a Peltier effect generator, in order to power, at least partially, operation of the local maintenance monitoring unit; and
  at least one sensor selected from a carbon monoxide sensor, a volatile organic compound sensor, a temperature sensor, a pressure sensor, a humidity sensor, a ventilation airflow sensor, a vibration sensor, a microphone, an altimeter, a position sensor of a mechanical element and a supply voltage sensor of the equipment. Optionally, it may also comprise at least one dedicated input for receiving an item of status data from the equipment. Then, the processor may advantageously be arranged in order to include in the data content, in step /v/ among the additional data, at least one measurement result produced by the sensor and/or at least one item of status data received by the dedicated input.

A second aspect of the invention proposes a method for validation of a task onto an item of equipment, which is carried out by a maintenance technician. This method comprises the following sequence of steps:
  /1/ installing a local maintenance monitoring unit according to the first aspect of the invention, near the equipment;
  /2/ by the portable communication terminal with which the maintenance technician is equipped: receiving from the external server an encryption key and the fresh check-value as transmitted to the external server upon the latest execution of step /iii/;
  /3/ by the maintenance technician during his task onto the equipment, and using his terminal: retrieving the data content as made available by the short-range display or communication means of the local maintenance monitoring unit; and
  /4/ by the terminal of the maintenance technician:
    /4-1/ extracting the fresh check-value and encrypted timestamp, from the data content retrieved;
    /4-2/ decrypting the encrypted timestamp using the encryption key;
    /4-3/ comparing the fresh check-value that was extracted in sub-step /4-1/ with the fresh check-value as received in step /2/, and comparing the timestamp that was decrypted in sub-step /4-2/ with a time delivered by the terminal, and if the fresh check-value extracted in sub-step /4-1/ and the fresh check-value as received in step /2/ are identical, and in addition the decrypted timestamp is compatible with the time delivered by the terminal according to a predetermined compatibility criterion, then the maintenance technician's task is validated, and if this is not the case, invalidated.

Possibly, the sequence of steps /2/ to /4/ may be repeated when the maintenance technician's task is invalidated in sub-step /4-3/. In this way, another attempt to validate his task can be carried out by the maintenance technician, in the event of failure of his first attempt.

In order to initialize the local maintenance monitoring unit during its installation, step /1/ can comprise:
  allocation and communication of the identifier to the local maintenance monitoring unit, from the external server via data transmission means of this local maintenance monitoring unit; and
  communication of the encryption key to the local maintenance monitoring unit.

When the data content contains a url, this data content may be retrieved by a user of the equipment using short-range display or communication means. The url can then be used by the user in order to communicate remotely with the company responsible for carrying out maintenance of the equipment, or with a manager who is responsible for organizing this maintenance, in particular in order to request a task assignment onto the equipment.

Finally, the data content collected in step /3/ may also contain, among the additional data, useful information for activating an alarm device for a lone worker. To this end, these items of useful information may be transmitted by the portable communication terminal of the maintenance technician to a support and emergency response centre, via the external communication network.

In particular, the equipment that is the subject of maintenance for which the invention is implemented, may be a domestic home heating boiler, an item of equipment for the production of domestic hot water, (DHW), or an item of equipment for controlled mechanical ventilation (CMV), each of these items of equipment capable of being for multiple or individual housing units.

BRIEF DESCRIPTION OF THE DRAWINGS

Other features and advantages of the present invention will become apparent from the following description of an embodiment which is in no way limiting, with reference to the attached drawings, in which.

DESCRIPTION OF THE PREFERRED EMBODIMENTS

Figure 1:
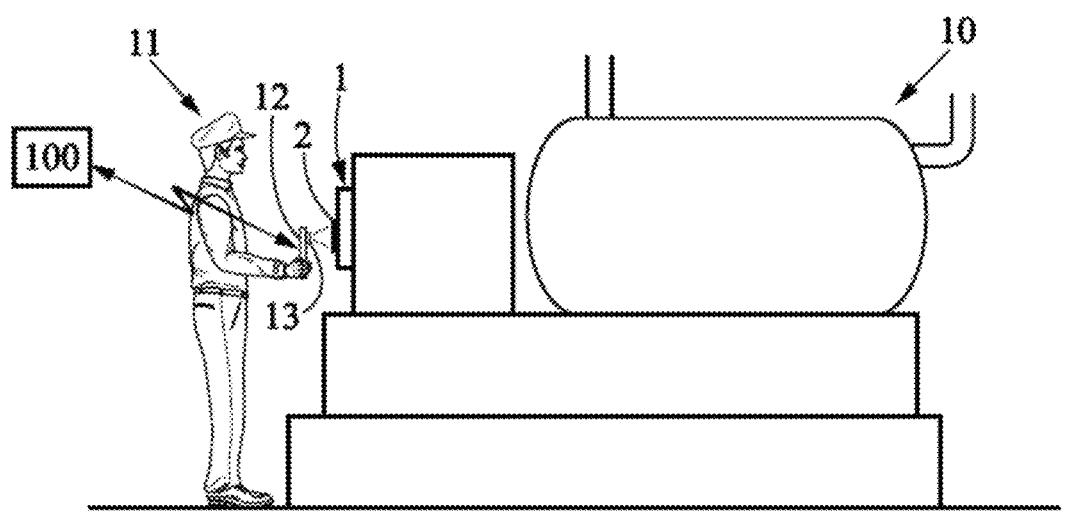
FIG. 1 shows an item of equipment in a maintenance situation, to which the invention can be applied.
Figure 2:
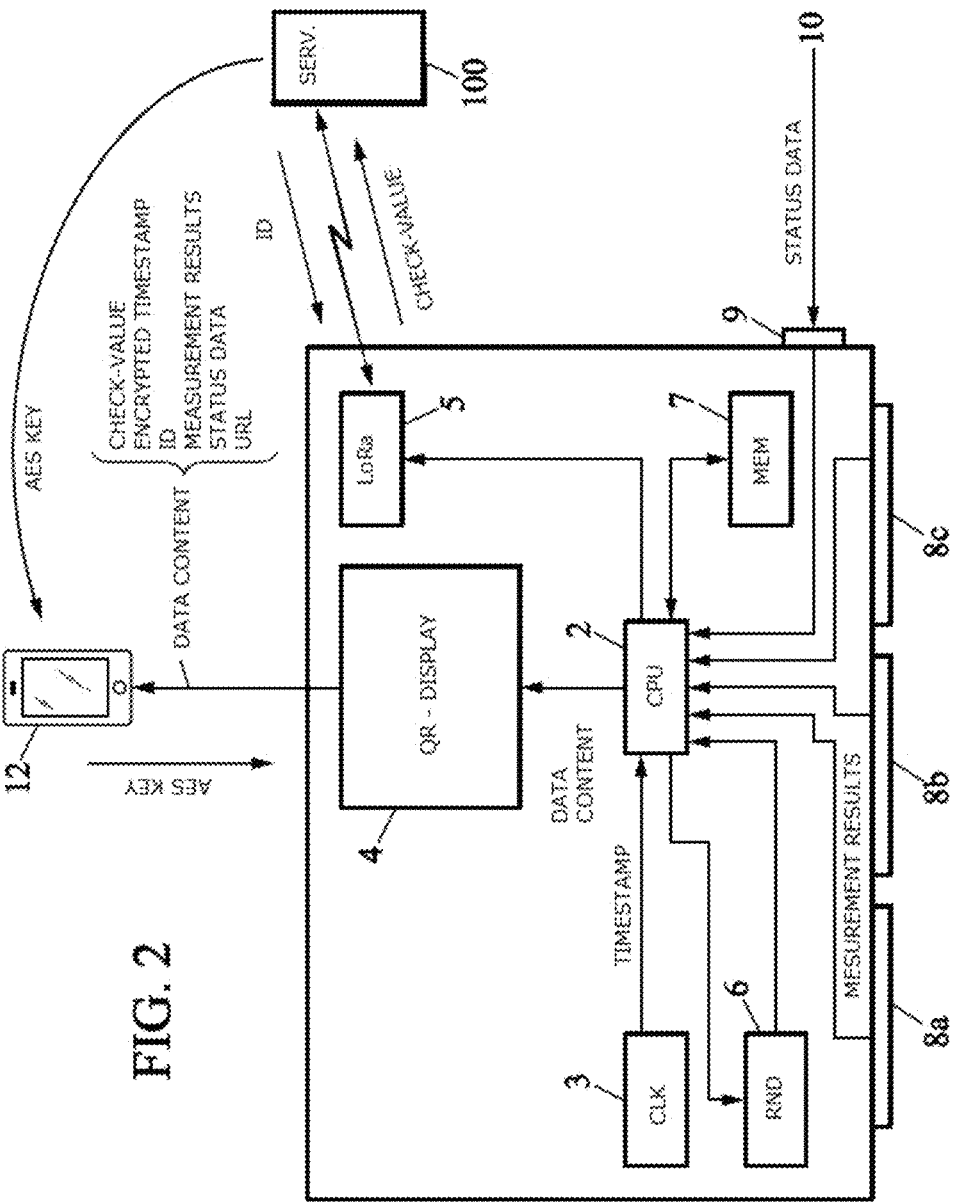
FIG. 2 is a diagram of a local maintenance monitoring unit according to the invention.

For sake of clarity, dimensions of the elements shown in FIGS. 1 and 2 do not correspond either to actual dimensions or to actual dimensional ratios. Moreover, identical references that are indicated in different figures denote identical elements or those having identical functions.

The invention is now described in detail for an item of heating equipment, such as an individual home heating boiler, for example in an apartment of a multiple housing unit. But it is understood that the invention can be applied to any other type of equipment and maintenance task or service, as was indicated at the start of the present description.

In the figures, the references indicated have the meanings listed below:
1 local maintenance monitoring unit
2 processor, marked CPU, of the local maintenance monitoring unit
3 clock, marked CLK, of the local maintenance monitoring unit
4 matrix display, marked QR-DISPLAY, of the local maintenance monitoring unit
5 data transmission means, marked LoRa, of the local maintenance monitoring unit
6 random number generator, marked RND, of the local maintenance monitoring unit
7 memory, marked MEM, of the local maintenance monitoring unit
8a-8c sensors, which are optional for the invention
9 at least one external signal input, which is incorporated into the local maintenance monitoring unit, and also optional
10 boiler forming the item of equipment that is the subject of maintenance in the example in question
11 maintenance technician assigned to perform a task on the boiler
12 portable communication terminal with which the maintenance technician is equipped
13 image capture device with which the portable communication terminal is equipped, for example a photographic camera
100 external server, marked SERV, for example of a centre for the monitoring or remote control of the task of the maintenance technician.

The local maintenance monitoring unit 1 is installed near, or on, the item of equipment 10. For example, it may have the form of a housing to be hung close to a control panel of the equipment 10. The local unit 1 includes the matrix display 4, preferably on its front face, and contains the processor 2, the clock 3, the random number generator 6 and the memory 7. In the example in question, the matrix display 4 constitutes the short-range display or communication means that have been introduced in the general part of this description. Advantageously, the matrix display 4 may be of E ink type.

The local unit 1 also comprises the data transmission means 5, which may comply with the LoRaWAN (Long-Range Wide Area Network) transmission protocol. These data transmission means 5, marked LoRa, make it possible to send data from the local unit 1 to the external server 100, and to receive data therefrom, via an external communication network such as a telephone network or an internet network.

Other optional components of the local unit 1 may be the sensors 8a-8c, the external signal input 9, an independent power source, means for detecting movement of the local unit 1 and alarm means. These components have not all been shown in the figures, as they are individually well known to a person skilled in the art.

The sensors 8a-8c may be selected as a function of the type of equipment 10 and the location of installation of this equipment. They may be selected in order to supply measurements that are useful for diagnosing an operational or fault status of the equipment 10, or for warning about task conditions that could be hazardous for the technician 11. For example, this may be a carbon monoxide sensor, a volatile organic compound sensor, a temperature sensor, a pressure sensor, a humidity sensor, etc.

The external signal input 9 may be connected to the item of equipment 10, for example in order to receive one or more item(s) of status data from the equipment, in particular in the form of binary data. Such status data may be in particular operation validation signals or error signals.

The optional independent power source may be a cell, a battery, a photovoltaic cell generator or a Peltier effect generator, according to the installation conditions of the item of equipment 10. This power source may supply the local unit 1 alone, or additionally to a wired power supply, or as a backup to such a wired power supply.

The means for detecting movement of the local maintenance monitoring unit 1 have the function of detecting such unplanned movement. In fact, by virtue of its function, the local unit 1 is intended to remain in place from the time of its installation, near the item of equipment 10 to which it is dedicated, and such movement, when unplanned, could be ill-intentioned or abnormal. These motion detection means may be constituted by an internal accelerometer of the local unit 1, or by any system for detecting the local unit 1 being pulled from its installation base. The local unit 1 then also includes alarm means that are activated by the movement detection means. For example, the alarm means may be a siren or means for transmitting an alarm signal to the remote monitoring or control centre, via data transmission means 5 of the local unit 1.

The functioning of the random number generator 6 is autonomous, for example by using a recursive algorithm that was programmed and loaded initially. In a known manner, such a random number generator 6 may be incorporated into the processor 2, despite being shown separately therefrom in FIG. 2. Each fresh operation of the random number generator 6 produces a fresh verification value, marked "check-value" in FIGS. 2 and 3, which has no apparent correlation with the preceding check-value, nor with any of the parameters of the item of equipment 10

Moreover, the processor 2 is designed in order to associate with each check-value that is produced by the random number generator 6, a timestamp of the operation thereof from which the check-value in question originated. The data pair thus formed by each check-value and its timestamp is stored in the memory 7, until it is replaced by a fresh check-value produced by a fresh operation of the random number generator 6, with its own timestamp.

Moreover, according to the invention, the processor 2 constructs a data content that is displayed on the matrix display 4. This data content groups together the check-value that is currently valid, i.e. the one stored in the memory 7, the associated timestamp, i.e. the one that is also stored in the memory 7, an identifier of the local maintenance monitoring unit 1, marked ID in FIGS. 2 and 3, and optional additional data such as one or more measurement result(s) delivered by the sensors 8a-8c, one or more items of status data of the equipment (10) received by the external signal input 9, a url, etc. However, before being incorporated into the data content, the timestamp is encrypted by the processor 2. The data content thus constructed is then encoded by the processor 2 into a format that is suitable for the local short-range display or communication means 1. In the event that these means are constituted by the matrix display 4, the data content may be put into the form of a QR code that is displayed. When this QR code is captured as an image by the maintenance technician 11, with his portable communication terminal 12, an application executed by this terminal restores the data content, so that at least some of its data that have not been encrypted can be read by the technician 11. The restored data can thus be used within the terminal 12, or retransmitted by the terminal 12 to the external server 100. The timestamp is decrypted within the terminal 12, the encryption having served to secure the transmission between the local unit 1 and the terminal 12. This encryption requires the local unit 1 to have available an encryption key, and the terminal 12 to have the same key in order to carry out decryption. Making this encryption key available will be described hereinafter with reference to FIG. 3. The encryption that is utilized may comply with the Advanced Encryption Standard (AES), but alternatively, other encryption methods can be used.

The portable communication terminal 12 may be a smartphone or telephone with internet access, a tablet, or a portable business terminal, which is provided with an image capture device, for example a photographic camera. The latter has a lens suitable for photographing the matrix display 2 of the local unit 1, showing the content that is displayed on the matrix display 2 sufficiently clearly in the captured images. The application for decoding QR codes that is hosted in the terminal 12 can then extract the QR code from the captured image, decode it and display data originating from the decoding on a screen of the terminal 12. Moreover, the terminal 12 also hosts a decryption application, which is used in order to decrypt the timestamp. Finally, in order to be linked to the external communication network, the communication terminal 12 may be equipped with a SIM card and suitable transmission means, for example mobile telephony means.

The external server 100 is also connected to the external communication network. It can thus transmit and receive data with the transmission means 5 of the local unit 1, and also independently with the terminal 12. In other words, the server 100, the local unit 1 and the terminal 2 have separate respective addresses for communicating via the external communication network.

Typically, the external server 100 stores a table, each row of which is dedicated to a different item of equipment, labelled with its identifier. The row that is dedicated to the item of equipment 10 groups together the following data (FIG. 3): the identifier ID of the local unit 1, the encryption key used by this local unit, the check-value that is currently valid, and additional optional data and information. These latter items may include a geographical address of the installation of the item of equipment 10, or geolocation coordinates of the item of equipment 10, a reference for the item of equipment, such as a model number, a serial number, certain measurement results that have been produced by sensors 8a-8c then transmitted to the server 100, an item of information concerning the planned task for the item of equipment 10, such as the reason for the maintenance task, etc.

Figure 3:
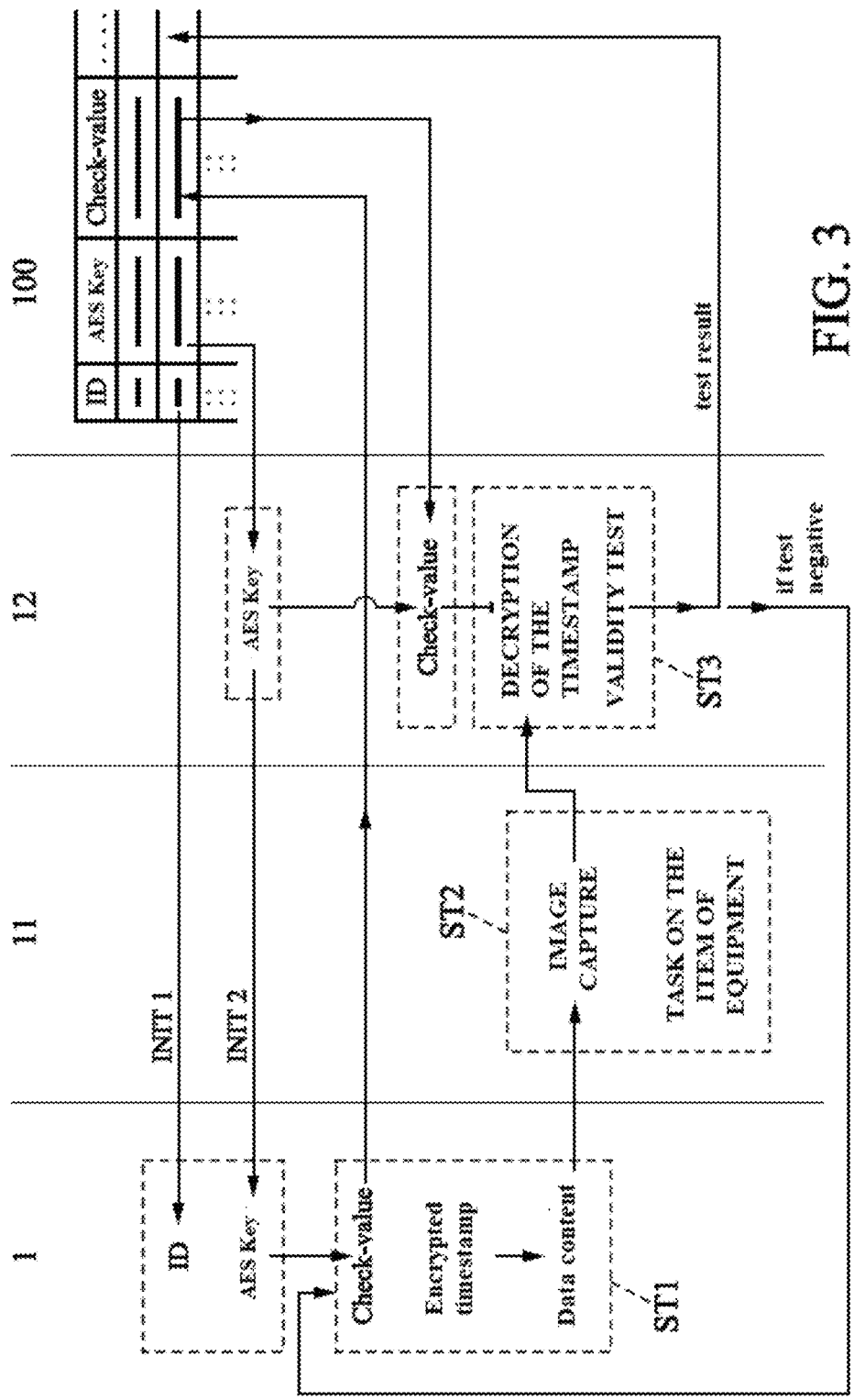
FIG. 3 shows steps of a method for validation of a task onto an item of equipment that implements the invention.

The four columns in FIG. 3 indicate the entities that carry out the steps described hereinafter, in order to implement a method according to the invention.

Steps INIT1 and INIT2 constitute an initialization of the local unit 1 when it is installed near the item of equipment 10.

Step INIT1 may consist of transmitting to the local unit 1 the identifier ID that has been allocated to it in the table of the server 100. This transmission may be carried out via the external communication network and the data transmission means 5 of the local unit 1.

Step INIT2 may consist of transmitting the encryption key, marked AES key, to the local unit 1. Preferably, this transmission may be carried out via an installation operator, who transfers the AES key to a local unit 1 using a portable communication terminal with which he is equipped. This transfer of the AES key, from the terminal of the installation operator to the local unit 1, may be carried out by NFC, for example.

Optionally, the initialization of the local unit 1 may also comprise one or more successive operations of the random number generator 6, in order to produce a first check-value considered valid.

The random number generator 6 is again activated subsequently, during a renewal sequence that may be initiated periodically, or at the end of a validity period of each check-value, or by a special command received by the local unit 1, or also by an event external to the local unit 1. In FIG. 3, the renewal sequence is indicated by the reference ST1. Each renewal sequence that is carried out comprises a fresh operation of the random number generator 6, the construction of fresh data content and the display thereof on the matrix display 4 as has been described above. Moreover, the fresh check-value is transmitted from the local unit 1, by the transmission means 5 thereof to the server 100, which stores it in its table.

Possibly, a validity period may be allocated to each check-value, corresponding to the period during which this check-value may be used in order to validate the task of the technician 11. This validity period may be determined based on the check-value itself, and counted down based on the timestamp relating to this check-value. In this case, the expiry of the validity period of the current check-value triggers a fresh execution of the renewal sequence by the local unit 1.

Also possibly, the renewal sequence may be triggered by a request that is transmitted by the company responsible for maintenance of the item of equipment 10, or by a manager of the item of equipment 10, and received by the data transmission means 5 of the local unit 1.

Again possibly, the terminal 12 of the maintenance technician 11 may be equipped with a geolocation system, so that the technician's approach to the item of equipment 10 can be detected automatically. In this case, the sequence of renewal of the data content can be triggered when the geolocation system reveals that the technician 11 is approaching the item of equipment 10 at a distance of less than a predetermined threshold, for example of less than 50 metres. Similarly, the renewal sequence can be triggered when the geolocation system reveals that the maintenance technician 11 is moving away from the item of equipment 10 by more than the predetermined distance threshold.

The server 100 may then send the terminal 12 the AES key and the latest check-value entered into the table, together with the identifier ID of the item of equipment 10. This transmission, which may be carried out via the external communication network, is independent of the local unit 1. Preferably, it is possible for the AES key to have been loaded beforehand into the terminal 12 before the departure of the technician 11 for the mission, by a secure means independent of the external communication network.

Step ST2 is carried out by the maintenance technician 11. It comprises capturing an image of the QR code that is displayed on the unit 1, and the task of the technician 11 on the item of equipment 10. This task may be a repair, upkeep, a cleaning or inspection operation, etc.

Step ST3 is carried out within the portable communication terminal 12 of the maintenance technician 11. The terminal 12 recovers the data content based on the image of the QR code that has been captured. The url, the results of at least some of the measurements carried out by the sensors 8a-8c, at least some of the status data received via the external signal input 9, as well as other data that may have been added to the data content can be displayed on a screen of the terminal 12, in order to be available for the technician 11. The check-value and encrypted timestamp are isolated from the data content. The timestamp is then decrypted by the terminal 12 using the AES key received beforehand. Then a validation test of the task assignment of the technician 11 is carried out within the terminal 12, involving both the check-value and the timestamp. This test may be carried out by a dedicated application that is hosted by the terminal 12. The validation test is declared positive if the check-value that was extracted from the data content transmitted via the QR code is identical to that received from the external server 100, and if in addition the decrypted timestamp is compatible with a current time supplied by the terminal 12. By "Compatible" is meant that the current time that is supplied by the terminal 12 is situated within the validity period of the check-value, taking account of a predetermined acceptable margin of error. If one of these two conditions is not satisfied, then the validation test is declared negative. The test result may be transmitted with the identifier ID of the local unit 1, by the terminal 12 to the server 100 via the external communication network, preferably without any action being required from of the technician 11. When the result of the validation test is negative, the server 100 may trigger a fresh execution of the renewal sequence ST1, and a message may be displayed on the terminal 12 in order to request the technician 11 to capture the fresh QR code that is displayed on the local unit 1. The test of validation of the task can then be repeated.

Optionally, the server 100 may trigger a fresh execution of the renewal sequence ST1 regardless of the result of the validation test, such that the check-value is modified as soon as it has been used once.

When the renewal sequence ST1 is executed periodically, it may be executed once per day, or once per half day, for example. Such a periodic triggering may be internal to the local unit 1, similarly to the instances of triggering that are caused by the expiry of the validity period of the check-value. All the different types of triggering may also be combined, without restriction.

Transmission of the encryption key and the check-value beforehand by the server 100 to the terminal 12 makes it possible to ensure that the technician 11 who will perform maintenance on the item of equipment 10 is actually the person who was assigned the task. In fact, another person who had not received the encryption key or the check-value on their terminal 12 would not be able to satisfy the validation test.

Moreover, the timeslot during which the technician 11 is located close to the item of equipment 10 can be monitored reliably because the check-value and the associated timestamp are a priori unknown to the technician 11, and are not accessible other than by taking a photograph of the matrix display 2.

Possibly, authentication of the technician 11 may be carried out by a biometric recognition test executed by the terminal 12. Such a test may involve a fingerprint or iris recognition, and its result may be transmitted to the external server 100 by the terminal 12 at the same time as the result of the validation test of the task assignment, based on the check-value and corresponding timestamp. The terminal 12 may be identified by simultaneously transmitting to the external server 100 identification data such as a telephone number of the communication terminal, or MSISDN (Mobile Station ISDN Number), an identification number of the user of the terminal, stored in the SIM card, such as the IMSI (International Mobile Subscriber Identity), an identification number of the terminal itself, such as the IMEI (International Mobile Equipment Identity), an internet identifier, such as an email address, or an agreed personnel code, etc. Geolocation coordinates of the communication terminal 12, corresponding to the moment when the two-dimensional code is captured, may also be transmitted simultaneously to the external server 100.

Optionally, the result of the validation test of the task assignment as well as some of the other identification elements that have just been indicated may be sent simultaneously to the external server 100, to a manager of the item of equipment 10 or of the building in which this equipment is installed, and also to a user of the item of equipment 10, such as a resident of the building. These transmissions also include information on their time of execution, forming additional evidence of the presence of the technician 11 close to the item of equipment 10 at that time.

A subsidiary use of the local maintenance monitoring unit 1 may dedicated to a user of the item of equipment 10. For example, when the item of equipment 10 has broken down or has a fault, a user, for example a resident of the apartment or building in which the boiler is installed, can take a photograph of the two-dimensional code that is displayed on the local maintenance monitoring unit 1, using their own smartphone. When the content of the code contains a url, decoding the two-dimensional code reveals this address, which he can use to contact a company responsible for the maintenance of the item of equipment or a manager responsible for organizing this maintenance, possibly in order to request a maintenance task. The data content that is recovered from the photographed two-dimensional code may be used to identify the item of equipment that is the subject of the task request. It may also be used to supply useful information on the reasons for the task requested, and optionally also for carrying out remotely an initial diagnosis of the equipment fault.

Finally, a further subsidiary use of the local maintenance monitoring unit 1 by the technician 11 relates to hazardous situations that may arise during the maintenance task. Indeed, the data content may include information on the circumstances of the hazard, in particular the results of the measurements that have been carried out by the sensors 8a-8c, useful for expediting assistance or emergency response. This useful information may then activate a lone worker protection (LWP) alarm device, and be transmitted by the terminal 12 to an assistance or emergency response centre the address of which is stored beforehand in the terminal 12.

A person skilled in the art will understand that multiple variants of the invention can be used, with respect to the method of utilization that has been described in detail above, while retaining at least some of the advantages mentioned. The main advantage is to guarantee that an assigned technician is actually located at the site of a maintenance task. The method of the invention is particularly robust in this aim, in relation to any intentions of cheating on the part of an unscrupulous technician. In particular, the method of transmission by display and capture of an image, between the local maintenance monitoring unit and the terminal of the maintenance technician, can be replaced by a short-range radio transmission, for example using Bluetooth® or NFC technology.

The invention claimed is:

1. A local maintenance monitoring device (1) for validating a task concerning an item of equipment (10), said device being adapted for capture, storage, and transmission of data relating to a task that is carried out by a maintenance technician (11) assigned to the equipment, said device comprising:
   a clock (3) internal to said local maintenance monitoring device (1);
   display or short-range communication means (4), configured to communicate with a portable communication terminal (12) of the maintenance technician (11) external to the local maintenance monitoring device (1);
   data transmission means (5), configured to communicate with an external server (100) via a communication network external to the local maintenance monitoring device (1);
   a processor (2) in communication with the communication means (4) and the data transmission means;
   a random number generator (6), internal to said local maintenance monitoring device (1) and in communication with the processor, that produces a fresh check-value randomly or pseudo-randomly upon each operation of the random number generator; and
   a memory (7) that stores a value in combination with a timestamp obtained from the clock (3),
   wherein said processor is configured to control the communication means (4) to transmit data content to the portable communication terminal (12), and
   wherein said processor (2) is further configured to execute sequential steps of:
      /i/ controlling a fresh operation of the random number generator (6) to produce the fresh check-value;
      /ii/ controlling an update of the memory (7) by writing to said memory the fresh check-value produced by the fresh operation of the random number generator (6), in combination with a timestamp of the fresh operation of the random number generator;
      /iii/ controlling the data transmission means (5) to transmit the fresh check-value to the external server (100), together with an identifier of the local maintenance monitoring device (1);
      /iv/ encrypting the timestamp of the fresh operation of the random number generator (6);
      /v/ including in the data content the fresh check-value, the encrypted timestamp, and the identifier of the local maintenance monitoring device (1); and then
      /vi/ controlling the display or short-range communication means (4) to make the data content available to the portable communication terminal (12).

2. The monitoring device (1) according to claim 1, wherein the display or short-range communication means (4) comprise a matrix display that is controlled by the processor (2) via step /iv/ to display a two-dimensional code that encodes the data content such that the data content is recoverable by the portable communication terminal via an image of the displayed two-dimensional code captured by an image capture device of the portable communication terminal (12).

3. The monitoring device (1) according to claim 2, wherein the two-dimensional code is any of a QR code, a Data Matrix, or an image of Flashcode type.

4. The monitoring device (1) according to claim 3, wherein the matrix display is of E ink type.

5. The monitoring device (1) according to claim 3, wherein the processor is further configured such that execution of steps /i/ to /vi/ is triggered by one of the following events:
   initialization or reinitialization of the local maintenance monitoring device (1);
   expiry of a validity period of the check-value stored in the memory (7), said validity period being determined by the processor (2) from said check-value;
   a command received by the local maintenance monitoring device (1) via the data transmission means (5) from either of the external server (100) or via the short-range communication means (4);
   completed execution of a validation test of the task, based on the check-value and on the timestamp, regardless of whether the result of the validation test is positive or negative; and
   geolocation of the portable communication terminal (12) of the maintenance technician (11) that reveals whether said portable communication terminal is moving away from or towards the local maintenance monitoring device (1) by crossing a distance threshold.

6. The monitoring device (1) according to claim 2, wherein the matrix display is of E ink type.

7. The monitoring device (1) according to claim 6, wherein the processor is further configured such that execution of steps /i/ to /vi/ is triggered by one of the following events:
   initialization or reinitialization of the local maintenance monitoring device (1);
   expiry of a validity period of the check-value stored in the memory (7), said validity period being determined by the processor (2) from said check-value;
   a command received by the local maintenance monitoring device (1) via the data transmission means (5) from either of the external server (100) or via the short-range communication means (4);
   completed execution of a validation test of the task, based on the check-value and on the timestamp, regardless of whether the result of the validation test is positive or negative; and
   geolocation of the portable communication terminal (12) of the maintenance technician (11) that reveals whether said portable communication terminal is moving away from or towards the local maintenance monitoring device (1) by crossing a distance threshold.

8. The monitoring device (1) according to claim 2, wherein the processor is further configured such that execution of steps /i/ to /vi/ is triggered by one of the following events:
   initialization or reinitialization of the local maintenance monitoring device (1);
   expiry of a validity period of the check-value stored in the memory (7), said validity period being determined by the processor (2) from said check-value;
   a command received by the local maintenance monitoring device (1) via the data transmission means (5) from either of the external server (100) or via the short-range communication means (4);
   completed execution of a validation test of the task, based on the check-value and on the timestamp, regardless of whether the result of the validation test is positive or negative; and
   geolocation of the portable communication terminal (12) of the maintenance technician (11) that reveals whether said portable communication terminal is moving away from or towards the local maintenance monitoring device (1) by crossing a distance threshold.

9. The monitoring device (1) according to claim 1, wherein the display or short-range communication means (4) is configured to transmit the data content to the portable communication terminal by one selected from the group of technologies consisting of: infra-red transmission, wired transmission, Bluetooth, NFC, LiFi and RFID.

10. The monitoring device (1) according to claim 1, wherein the processor is further configured such that execution of steps /i/ to /vi/ is triggered by one of the following events:
   initialization or reinitialization of the local maintenance monitoring device (1);
   expiry of a validity period of the check-value stored in the memory (7), said validity period being determined by the processor (2) from said check-value;
   a command received by the local maintenance monitoring device (1) via the data transmission means (5) from either of the external server (100) or via the short-range communication means (4);
   completed execution of a validation test of the task, based on the check-value and on the timestamp, regardless of whether the result of the validation test is positive or negative; and
   geolocation of the portable communication terminal (12) of the maintenance technician (11) that reveals whether said portable communication terminal is moving away from or towards the local maintenance monitoring device (1) by crossing a distance threshold.

11. The monitoring device (1) according to claim 1, wherein the processor (2) is further configured to include in the data content in step /v/ an unencrypted uniform resource locator (url).

12. The monitoring device (1) according to claim 1, wherein the data transmission means (5) complies with a protocol selected from the group consisting of: LoRaWAN, WiFi, Sigfox®, and mobile telephony protocols.

13. The monitoring device (1) according to claim 1, further comprising:
   at least one sensor (8a-8c) selected from the group consisting of a carbon monoxide sensor, a volatile organic compound sensor, a temperature sensor, a pressure sensor, a humidity sensor, a ventilation airflow sensor, a vibration sensor, a microphone, an altimeter, a position sensor of a mechanical element, a supply voltage sensor of the equipment (10),
   and wherein the processor (2) is further configured to include in the data content in step /v/ a measurement result produced by said at least one sensor (8a-8c) and an item of status data received by said at least one input (9).

14. The monitoring device (1) according to claim 13, wherein said at least one input (9) is configured for receiving an item of equipment status data.

15. A method for validation of a task onto an item of equipment (10), carried out by a maintenance technician (11), the method comprising the following sequence of steps:
   /1/ installing a local maintenance monitoring device (1) at the equipment (10), said local maintenance monitoring device comprising
      a clock (3) internal to said local maintenance monitoring device (1);
      short-range communication means (4), configured to communicate with a portable communication terminal (12) of the maintenance technician (11) external to the local maintenance monitoring device (1);
      data transmission means (5), configured to communicate with an external server (100) via a communication network external to the local maintenance monitoring device (1);
      a processor (2) in communication with the communication means (4) and the data transmission means;
      a random number generator (6), internal to said local maintenance monitoring device (1) and in communication with the processor, that produces a fresh check-value randomly or pseudo-randomly upon each operation of the random number generator; and
      a memory (7) that stores a value in combination with a timestamp obtained from the clock (3),
   said processor configured to control the communication means (4) to transmit data content to the portable communication terminal (12), and said processor (2) further configured to execute sequential steps of:
      /i/ controlling a fresh operation of the random number generator (6) to produce the fresh check-value;
      /ii/ controlling an update of the memory (7) by writing to said memory the fresh check-value produced by the fresh operation of the random number generator (6), in combination with a timestamp of the fresh operation of the random number generator;
      /iii/ controlling the data transmission means (5) to transmit the fresh check-value to the external server (100), together with an identifier of the local maintenance monitoring device (1);
      /iv/ encrypting the timestamp of the fresh operation of the random number generator (6);
      /v/ including in the data content the fresh check-value, the encrypted timestamp, and the identifier of the local maintenance monitoring device (1); and then
      /vi/ controlling the short-range communication means (4) to make the data content available to the portable communication terminal (12);
   /2/ by the portable communication terminal (12): receiving from the external server (100) an encryption key and the fresh check-value as transmitted to said external server upon the latest execution of step /iii/;
   /3/ by the the portable communication terminal (12): retrieving the data content as made available by the display or short-range communication means (4) of the local maintenance monitoring device (1); and
   /4/ by the portable communication terminal (12):
      /4-1/ extracting the fresh check-value and encrypted timestamp, from the data retrieved;
      /4-2/ decrypting the encrypted timestamp by using the encryption key;
      /4-3/ comparing the fresh check-value extracted in sub-step /4-1/ with the fresh check-value as received in step /2/, and comparing the timestamp decrypted in sub-step /4-2/ with a time delivered by the portable communication terminal (12), and if said fresh check-value extracted in sub-step /4-1/ and said fresh check-value as received in step /2/ are identical also if the decrypted timestamp is compatible with the time delivered by the portable communication terminal (12) according to a predetermined compatibility criterion, then the task of the maintenance technician (11) is validated, and otherwise the task of the maintenance technician (11) is invalidated.

16. The method according to claim 15, wherein the sequence of steps /2/ to /4/ is repeated when the task assignment of the maintenance technician (11) is invalidated in sub-step /4-3/.

17. The method according to claim 15, wherein step /1/ further comprises:
- allocation and communication of the identifier to the local maintenance monitoring device (1), from the external server (100) and via the data transmission means (5) of said local maintenance monitoring device; and
- communication of the encryption key to the local maintenance monitoring device (1).

18. The method according to claim 15, wherein the data content is retrieved by a user of the equipment (10) using the display or short-range communication means (4), and then the url is used by said user to communicate remotely, either with a company responsible for carrying out maintenance of the equipment or with a manager responsible for organizing the maintenance, in order to request a new task concerning the equipment.

19. The method according to claim 15, wherein the data content retrieved in step /3/ also contains information for activating an alarm device, and said information are transmitted by the portable communication terminal (12) to an assistance and emergency response centre, via the external communication network.

20. The method according to claim 15, wherein the equipment (10) is one of an individual home heating boiler, an item of equipment for the production of domestic hot water, or an item of equipment for controlled mechanical ventilation.

* * * * *